United States Patent
Benmoussa

(10) Patent No.: US 9,139,295 B2
(45) Date of Patent: Sep. 22, 2015

(54) METHOD OF CONTROLLING THE STEERING OF A STEERABLE PORTION OF AN AIRCRAFT UNDERCARRIAGE

(75) Inventor: Michaël Benmoussa, Antony (FR)

(73) Assignee: MESSIER-BUGATTI-DOWTY, Velizy Villancoublay (FR)

( * ) Notice: Subject to any disclaimer, the term of this patent is extended or adjusted under 35 U.S.C. 154(b) by 0 days.

(21) Appl. No.: 13/530,783

(22) Filed: Jun. 22, 2012

(65) Prior Publication Data

US 2012/0330482 A1    Dec. 27, 2012

(30) Foreign Application Priority Data

Jun. 27, 2011   (FR) ...................................... 11 55705

(51) Int. Cl.
*B64C 25/50*    (2006.01)
*B60G 17/019*   (2006.01)
*F41G 7/20*     (2006.01)

(52) U.S. Cl.
CPC ...................................... *B64C 25/50* (2013.01)

(58) Field of Classification Search
CPC .... B64C 25/50; B60G 17/019; G05D 1/0066; G05D 1/0204; F41G 7/20; G01B 11/028; H01Q 1/28; H01Q 3/26; B62D 7/1509
USPC ............... 701/3; 244/76 R, 3.16, 103 W, 184; 73/781; 342/359; 356/498
See application file for complete search history.

(56) References Cited

U.S. PATENT DOCUMENTS

| | | | |
|---|---|---|---|
| 3,815,850 A * | 6/1974 | Tribuno et al. ................ | 244/184 |
| 5,167,385 A * | 12/1992 | Hafner ......................... | 244/76 R |
| 6,658,942 B1 * | 12/2003 | Faesch ............................. | 73/781 |
| 6,722,610 B1 * | 4/2004 | Rawdon et al. .......... | 244/103 W |
| 2006/0152410 A1 * | 7/2006 | Shi ................................. | 342/359 |
| 2007/0216910 A1 * | 9/2007 | Franceschini et al. ........ | 356/498 |
| 2011/0046819 A1 * | 2/2011 | Bailbe et al. ..................... | 701/3 |
| 2012/0305697 A1 * | 12/2012 | Kerhuel et al. ............. | 244/3.16 |
| 2012/0330482 A1 * | 12/2012 | Benmoussa ....................... | 701/3 |

* cited by examiner

*Primary Examiner* — Tuan C. To
*Assistant Examiner* — Yuri Kan
(74) *Attorney, Agent, or Firm* — Sughrue Mion, PLLC

(57) ABSTRACT

The invention relates to a method of controlling the steering of a steerable portion of an aircraft undercarriage that is fitted both with a steering member for steering the steerable portion and also with at least two angular position sensors for sensing the angular position of the steerable portion in order to deliver respective signals representative of the angular position of the steerable portion, wherein the steering member is controlled by means of servo-control using information that is representative of the angular position of the steerable portion. According to the invention, the information representative of the angular position that is used is a mean of the angular positions sensed by the at least two angular position sensors.

4 Claims, 1 Drawing Sheet

METHOD OF CONTROLLING THE STEERING OF A STEERABLE PORTION OF AN AIRCRAFT UNDERCARRIAGE

The invention relates to a method of controlling the steering of a steerable portion of an aircraft undercarriage.

TECHNOLOGICAL BACKGROUND

Certain undercarriages include a steerable bottom portion, with this applying in particular to nosewheel undercarriages, thereby enabling the aircraft to be steered on the ground. For this purpose, the undercarriage is fitted with actuators (jacks in a push-pull configuration, a rack engaging a pinion) enabling the steerable portion to be pivoted in response to a steering order, e.g. generated by means of a steering wheel in the cockpit.

Feedback is provided by means of an angular position sensor arranged on the undercarriage to measure the angular position of the steerable portion and to deliver an angular position signal that is used for forming a feedback loop for servo-controlling angular position.

In known manner, the angular position sensor is duplicated by means of a second angular position sensor so that two angular position signals are generated. Only one of these signals is used for servo-controlling angular position, with the other angular position signal being used for monitoring proper operation of the first angular position sensor. In the event of disagreement between the two signals, servo-control is interrupted and the steerable portion of the undercarriage is allowed to swivel freely. The aircraft pilot can then steer the aircraft by differential braking.

It has been found that under certain circumstances, in particular when making tight turns, or indeed when traveling in a straight line while braking, or merely in the event of the aircraft being nose-heavy, thereby giving rise to a large static force on the undercarriage, that the signals delivered by the angular position sensors may be offset by a certain amount relative to the steering angle actually achieved by the steerable portion of the undercarriage.

OBJECT OF THE INVENTION

An object of the invention is to provide an improved method of controlling the steering of a steerable portion of an aircraft undercarriage, the improvement relating in particular to the accuracy of the servo-control.

DESCRIPTION OF THE INVENTION

In order to achieve this object, the invention provides a method of controlling the steering of a steerable portion of an aircraft undercarriage that is fitted both with a steering member for steering the steerable portion and also with at least two angular position sensors for sensing the angular position of the steerable portion in order to deliver respective signals representative of the angular position of the steerable portion, wherein the steering member is controlled by means of servo-control using information that is representative of the angular position of the steerable portion. According to the invention, the information representative of the angular position that is used is a mean of the angular positions sensed by the at least two angular position sensors.

Thus, the information representative of the angular position of the steerable portion is less sensitive to deformations of the undercarriage that might disturb the signals delivered by the angular position sensors. Such deformations occur in particular under the above-mentioned circumstances.

Preferably, the angular position sensors are arranged on the undercarriage in diametrically-opposite manner, on either side thereof relative to a plane of symmetry of the aircraft.

In this way, the position errors that affect one of the angular position sensors are compensated more effectively by the position errors that affect the other angular position sensor.

BRIEF DESCRIPTION OF THE FIGURES

The invention can be better understood with reference to the figures of the accompanying drawings, in which.

DETAILED DESCRIPTION OF AN EMBODIMENT OF THE INVENTION

Figure 1:
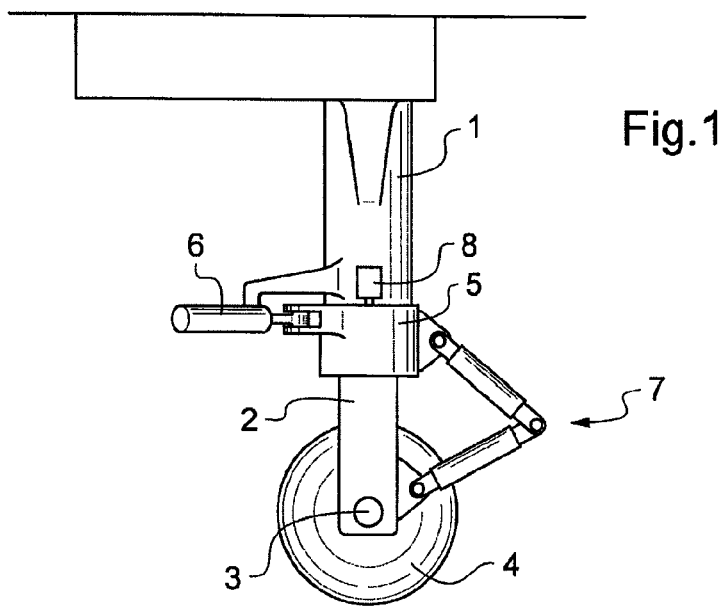
FIG. 1 is a diagrammatic side view of an aircraft undercarriage with a steerable bottom portion.

With reference to the figures, an aircraft nosewheel undercarriage typically comprises a strut 1 hinge-mounted to the structure of the aircraft. A brace member (not shown) extends between the structure of the aircraft and the strut in order to stabilize the strut 1, and thus the undercarriage, in its deployed position, as shown.

A rod 2 slides in the strut 1 and the bottom end of the rod carries an axle 3 receiving wheels 4. A collar 5 is mounted to turn on the bottom portion of the strut 1 so as to enable it to be steered in controlled manner by a steering member, constituted in this example by actuators 6 mounted in push-pull. The collar 5 and the rod 1 are constrained to turn together by a scissors linkage 7 such that steering the collar 5 causes the rod 2 to be steered and thus also the wheel 4. Angular position sensors 8 are arranged on the strut to measure the angular position of the collar 5 and thus of the wheel 4. The angular position sensors 8 deliver annular position signals that are used by a steering computer arranged in the aircraft to control the steering of the wheels 4 in response to a steering order generated by the pilot, by pressing on pedals or by turning a steering wheel.

All this is well known and is recalled merely by way of information in order to situate the context of the invention.

According to the invention, the steering computer is adapted to calculate a mean of the angular positions sensed by the angular position sensors 8 and to make use of this mean for implementing servo-control of the angular position of the wheels 4 by appropriately controlling the actuators 6 of the steering member.

Figure 2:
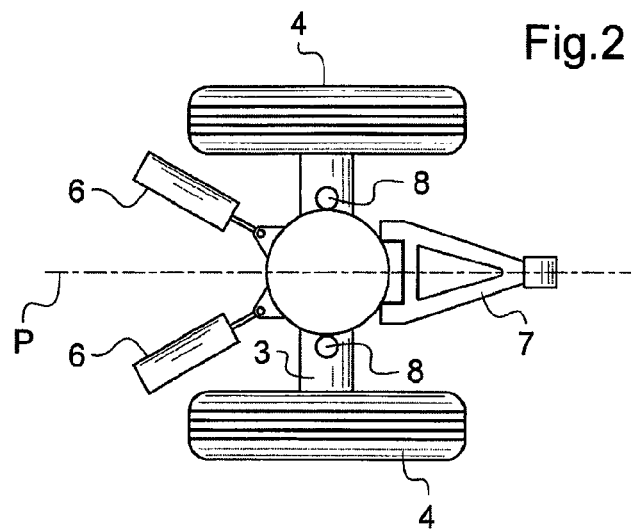
FIG. 2 is a plan view of the FIG. 1 undercarriage.

Using the mean of the angular positions sensed by the sensors serves to diminish the effect of deformation of the undercarriage, and in particular of the lateral deflection to which the undercarriage is subjected while the aircraft is turning. It is known that, while turning, the lateral forces that act on the tires of the wheels tend to deflect the undercarriage, thereby varying the angle information as generated by each of the sensors. However, if the angular position sensors are arranged on the undercarriage symmetrically about a longitudinal plane of symmetry P containing the longitudinal axis of the aircraft (as shown in FIG. 2), then the variation to which one of the sensors is subjected as a result of the lateral deflection of the undercarriage is substantially compensated by the opposite variation to which the other angular position sensor is subjected, such that the mean of the positions sensed by the two sensors is indeed more representative of the real angular position of the wheels. This improves the quality of the angular position information and thus improves the accuracy of the servo-control. Likewise, when braking in a straight line, or when the aircraft is nose-heavy, the undercarriage is subjected to longitudinal deflection that can give rise to errors in the angular positions sensed by the sensors. Taking the mean of the angular positions makes it possible to compensate, at least in part, for the effect of deformations induced by such deflection.

Figure 3:
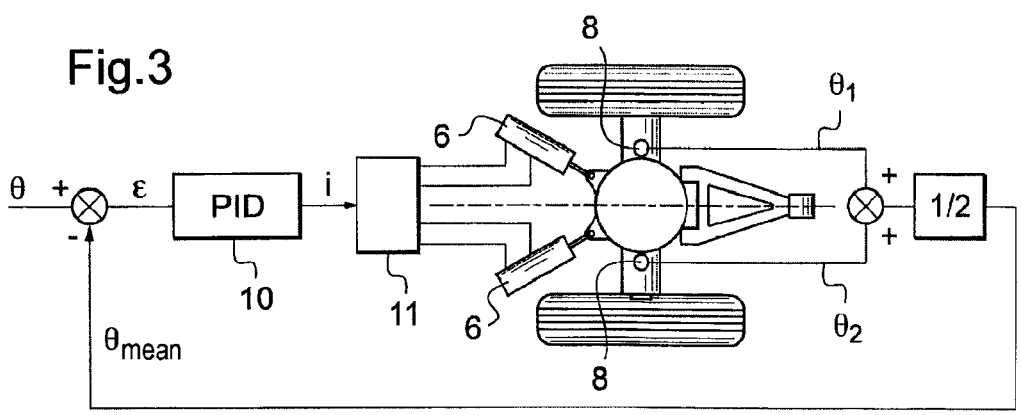
FIG. 3 is a diagram showing how angular position is servo-controlled in the invention.

Servo-control is illustrated in FIG. 3, where it can be seen that the feedback signal $\theta_{mean}$ is constituted by the average of the angular positions $\theta_1$ and $\theta_2$ as sensed by the two angular position sensors 8. More precisely, the servo-control that is implemented by the steering computer comprises calculating an error $\epsilon$ between a steering setpoint $\theta$, e.g. coming from a steering wheel in the cockpit, and the feedback signal $\theta_{mean}$. The error in this example is fed to a proportional integral differential (PID) controller 10 that generates control current i applied to a servo-valve 11 that feeds the actuators 6 of the steering member. The angular position sensors 8 respond by sensing respective angular positions $\theta_1$ and $\theta_2$ that are summed and then divided by two in order to obtain the arithmetic mean that is used as the feedback signal.

With the sensors in symmetrical positions, it can be assumed that the angular position sensors are influenced in the same manner (although in opposite directions) by the disturbing deformations to which the undercarriage is subjected. It is then advantageous to use an arithmetic mean of the angular position signals generated by the angular position sensors. The angular position sensors are preferably arranged in diametrically-opposite manner.

Nevertheless, if the angular position sensors are not arranged symmetrically, it is advantageous to use a weighted mean of the angular position signals in order to take account of the respective sensitivities of each of the angular position sensors to the disturbing deformations to which the undercarriage is subjected while turning.

What is claimed is:

1. A method of controlling the steering of a steerable portion of an aircraft undercarriage that is fitted both with a steering member for steering the steerable portion and also with at least two angular position sensors for sensing the angular position of the steerable portion in order to deliver respective signals representative of the angular position of the steerable portion, the method comprising:
   sensing the angular position of the steerable portion in order to deliver respective signals representative of the angular position of the steerable portion, and
   controlling the steering member by means of servo-control using information that is representative of the angular position of the steerable portion in order to control the steering of the steerable portion of the aircraft undercarriage,
   wherein the information representative of the angular position that is used is a mean of the angular positions sensed by the at least two angular position sensors so that said information is less sensitive to deformations of the undercarriage that might disturb the respective signals delivered by the angular position sensors, and
   wherein the mean of the angular positions are constituted by the average of the angular positions sensed by the at least two angular position sensors.

2. The method according to claim 1, wherein the angular position sensors are arranged on the undercarriage in symmetrical manner about a longitudinal plane of symmetry of the aircraft.

3. The method according to claim 2, wherein the angular position sensors are placed on the undercarriage in diametrically-opposite manner.

4. The method according to claim 2, wherein the mean of the angular position signals is an arithmetic mean.

* * * * *